No. 838,818. PATENTED DEC. 18, 1906.
M. R. SPELMAN.
METHOD OF EXTRACTING SACCHARINE MATTER FROM SUGAR CANE.
APPLICATION FILED AUG. 30, 1904.
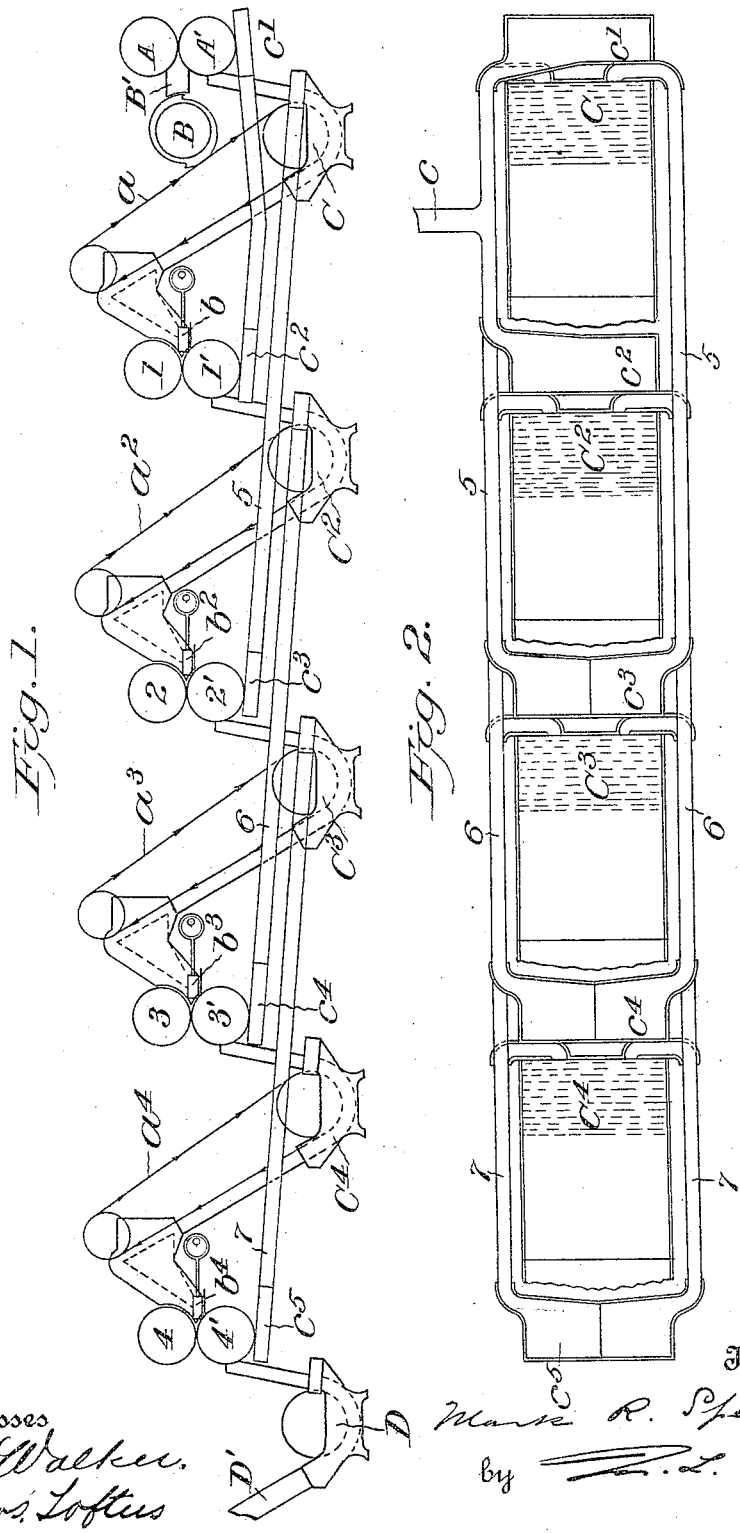

UNITED STATES PATENT OFFICE.

MARK R. SPELMAN, OF NEW YORK, N. Y.

METHOD OF EXTRACTING SACCHARINE MATTER FROM SUGAR-CANE.

No. 838,818.  Specification of Letters Patent.  Patented Dec. 18, 1906.

Application filed August 30, 1904. Serial No. 222,718.

*To all whom it may concern:*

Be it known that I, MARK R. SPELMAN, a citizen of the United States of America, and a resident of the borough of Manhattan, New York city, in the State of New York, have invented a new and useful Improvement in Methods of Extracting Saccharine Matter from Sugar-Cane, of which the following is a specification.

This invention relates to a method of production primarily designed to be carried into effect by automatic machinery, but capable of utilization by machinery which is not automatic or is only in part automatic and by apparatus differing more or less widely in construction and mode of operation.

The improved sugar-cane mill preferably employed for carrying the process into effect will be made the subject-matter of another patent specification and will only be referred to in the present specification incidentally and to such extent as may be necessary to make the process clear to those skilled in the art.

The present invention consists in the novel process or method of production, as hereinafter set forth and claimed.

Methods heretofore in use for extracting saccharine matter from sugar-cane or those most generally used have respectively depended on the pressing of the cane by passing it substantially dry between rollers, the cane being sometimes prepared by sprinkling water on it (hereinafter termed the "roller-pressing" method) and on washing out the saccharine matter in what are termed "diffusion-wells," (hereinafter termed the "diffusion" method.) Both of these methods have been open to serious objections; but so far as I am aware the leading producers at least have after more or less experiment settled down to using either the roller-pressing method or the diffusion method without any attempt to utilize the advantageous features of the two methods by combining them.

The leading object of the present invention is to so combine the roller-pressing and diffusion methods in a continuous process for the extraction of the saccharine matter or sucrose-containing liquid as to utilize the advantageous features of both and to avoid their respective disadvantageous characteristics.

The leading disadvantageous characteristic of the roller-pressing operation is the loss of a large percentage of sugar that is not extracted and is burned with the bagasse. That of the diffusion method is a waste of time and fuel in the evaporation of the large percentage of water diluting the juice.

By the present combined method the sugar can be as fully extracted as by the diffusion method, and the juice is delivered by the mill in nearly or quite as concentrated a state as by the roller-pressing method.

The principle on which the combined method works may be compared to the cleansing of a sponge by first compressing it, then permitting it to absorb water, then compressing it to expel the water with such matter as it will carry with it, then permitting the sponge to absorb fresh water, then again expressing the contents, and so on alternately compressing the sponge and permitting it by its own elasticity to fill itself with liquid, which is expressed in the act of compressing the sponge for the next operation.

The success of the process depends largely on a novel treatment of the cane, hereinafter termed "cutting," whereby after being flattened by the crushing-rolls the cane is reduced to "chips" in the form of short pieces severed by cuts substantially at right angles to the length of the cane, so that each piece equally exposes both ends of a short length of the sucrose-holding tissue, whereby this tissue is adapted to alternately absorb the diffusion liquid at both ends of each piece and to discharge the same at both ends under pressure, the absorption being materially promoted by the tendency of the pieces of cane so cut into short lengths to resume their original shape when freed from pressure and permitted to expand within the diffusion-wells, and thus to fill themselves by suction.

Other objects will be set forth in the description which follows.

A sheet of drawings accompanies this specification as part thereof.

Figure 1 is a diagrammatic longitudinal section through the series of rolls, diffusion-wells, &c., of the improved sugar-cane mill hereinbefore referred to. Fig. 2 is a diagrammatic plan view of the same, showing its catch-basins, juice-troughs, and diffusion-wells, as hereinafter described.

Like numbers and letters refer to like parts in both figures.

The sucrose-containing liquid expressed by the crusher and repressing-rolls in common is herein termed "juice." The dilute liquid contained in the diffusion-wells is termed "water."

In carrying the invention into effect the cane after a first pressing or "crushing" by means of suitable crushing-rolls A and A' is reduced to chips in the form of short pieces, preferably from three-eighths of an inch to three-fourths of an inch long, by a chopping or cutting operation, such as may be and is preferably effected by means of a rotary cutter B and a cutting-table B', cutting the cane substantially at right angles to its length and exposing the cellular tissues of the cane at both ends of each chip. In this condition the cane falls into a diffusion-well C, in which it is immersed in a positive manner by the flights of a conveyer $a$, which permits the chips to expand beneath the water and then transfers the expanded chips with what water they have absorbed to the feeder $b$ of a first pair of repressing-rolls 1 and 1', between which the chips are mechanically fed by said feeder, so as to preclude any interruption in the process. The repressed chips fall from the rolls last named (1 and 1') into a second diffusion-well $C^2$, where they are again immersed by the flights of a conveyer $a^2$, and after again absorbing water are reëlevated to the feeder $b^2$ of a second pair of repressing-rolls 2 and 2'. From this second pair of repressing-rolls 2 and 2' the chips fall into a third diffusion-well $C^3$, in which they are immersed by the flights of a third conveyer $a^3$, and after again absorbing water are reëlevated and delivered to another mechanical feeder $b^3$, by which they are fed between a third pair of repressing-rolls 3 and 3', from which the chips fall into a fourth diffusion-well $C^4$, in which they are immersed by the flights of a conveyer $a^4$, and thence reëlevated and delivered to the feeder $b^4$ of a fourth pair of repressing-rolls 4 and 4', from which they drop into the hopper D of a bagasse-conveyer D'.

The cane in passing through the crusher A A' is flattened and reduced to from forty per cent. to fifty per cent. of its weight and volume by the expression of juice. The flattened cane then passes to the cutter-table B' and is cut into chips at right angles, as aforesaid, exposing the cells containing what sweet matter remains. The chips are forced down and through the liquid in the respective diffusion-wells by suitably-arranged flights on the several conveyers and are introduced positively and equally between the repressing-rolls by the several feeders. The chips after passing the last rolls are carried by the bagasse-conveyers to suitable driers and thence to furnaces for use as fuel.

The juice expressed by the crusher and by the respective pairs of repressing-rolls is caught by catch-basins $c'$, $c^2$, $c^3$, $c^4$, and $c^5$. (Compare Figs. 1 and 2.) The first and second catch-basins $c'$ and $c^2$ discharge direct, as shown in Fig. 2, into a main catch-basin $c$. The third juice-trough $c^3$ discharges by way of a connecting-trough 5 at each side of the mill into the first diffusion-well C, the connecting-troughs being preferably and conveniently so extended as to discharge into the front side of the well at points between its ends, so that the entering juice shall be effectively distributed and shall flow directly upon the descending chips. The fourth catch-basin $c^4$ discharges in like manner by way of connecting-troughs 6 into the second diffusion-well $c^2$, and the fifth catch-basin $c^5$ discharges in like manner by way of connecting-troughs 7 into the third diffusion-well $C^3$.

The last diffusion-well $C^4$ is supplied with water, hot or cold, in measured quantities, and water may be introduced in like manner into one or more of the other diffusion-wells, if necessary, to supplement the supply of juice flowing into them, only so much water being introduced as may be necessary to complete the washing out of the saccharine matter in the series of diffusion-wells and always so as to flow toward the richest—that is to say, toward the chips containing the most sweet juice.

It is estimated as the result of experiments that four repressing operations after the preliminary crushing operation and four immersions of the chips in the diffusion-wells will be the most that will be required for the complete extraction of the saccharine matter. The number of operations may, however, be increased or diminished without departing from the method of extraction in which the present invention consists.

It will be noticed that this method prepares the cane to absorb liquid by exposing and compressing the cellular tissue, compels the absorption of water in each diffusion-well by a positive immersion of the chips, and squeezes the juice out by the succeeding set of repressing-rolls, thoroughly washing out the sucrose or sweet juice from the cellular tissue of the cane. The chipped cane is not shredded, as in some other processes, but maintains approximately its original shape when expanded and tends to resume this shape after each compression during each successive immersion and by its repeated squeezings and immersions is or may be thoroughly washed in a mill of limited extent, such as is represented by the drawings. Not only so, the bagasse, as compared with that of the old diffusion method, is readily dried and in good condition to be used as fuel with or without the addition of other substances to facilitate combustion.

I am aware that certain other processes of extracting the saccharine matter or sucrose from sugar-cane by roller-pressing and diffusion combined have been patented, and I do not claim such combination except as hereinafter stated.

In such other processes the cane has been passed through the diffusion-wells as it comes from the ordinary roller pressing or grinding mill in long lengths simply flattened, or else the flattened cane has been converted into long strips by a shredding operation.

The flattened cane, even when it is cut into strips or shredded, will not absorb the water as rapidly, freely, or thoroughly as the same quantity of cane when cut into chips in the peculiar manner hereinbefore set forth, one reason being that the bark of the cane is a non-absorbent. It contains a gum or oil which prevents any liquid from penetrating into the cells of the cane. In the case of the chips the operation of cutting the cane into short pieces exposes the ends of the cellular tissue, so that they will freely admit the water, and also breaks the bark of the cane more effectively, owing to the fact that the same strength or resistance of the bark does not exist in the short chips as exists in the long strips when uncut.

In the present combined process the cane after passing between crushing-rolls is reduced to the peculiar form of chips hereinbefore specified, and this operation preliminary to diffusion is considered an essential feature of the invention, as hereinafter claimed.

The term "substantially at right angles to the length of the cane" as herein employed does not exclude such variations from an actual right angle as may result from the accidental deviation of the cane from straight lines in passing lengthwise over a cutting-table, such as is shown at B', nor from the use of a rotary cutter, such as is shown at B. The term is also not intended to call for chips having ends at right angles to the length of the cane in all directions. It is sufficient if the crushed and flattened cane be cut crosswise into short lengths having the characteristics hereinbefore set forth.

Having thus described said improvement, I claim as my invention and desire to patent under this specification—

1. The method of extracting saccharine matter from sugar-cane which consists in first pressing the cane and thereby flattening it and reducing it in weight and volume by the expression of juice, then cutting the cane into chips in the form of short pieces having ends substantially at right angles to the length of the cane and exposing the cellular tissue at both ends of each piece, then repeatedly immersing such chips in water beneath which they are permitted to expand so as to fill themselves with water, repressing the expanded chips after each immersion to express their liquid contents including successive quantities of saccharine matter, and collecting the expressed juice.

2. The method of extracting saccharine matter from sugar-cane, consisting in first crushing the cane and thereby flattening it and reducing it from forty to fifty per cent. of its weight and volume by the expression of juice, then cutting the cane into chips in the form of short pieces having ends substantially at right angles to the length of the cane and exposing the cellular tissue at both ends of each piece, repeatedly immersing such chips in water beneath which they are permitted to expand so as to fill themselves with water, repressing the expanded chips after each immersion to express their liquid contents including successive quantities of saccharine matter, and collecting the expressed juice.

3. In the extraction of saccharine matter from sugar-cane by roller-pressing and diffusion combined, the method of treating the cane, consisting in first crushing it and in its crushed and flattened condition cutting it into chips in the form of short pieces less than one inch long having ends substantially at right angles to the length of the cane and exposing the cellular tissue at both ends of each chip, whereby such chips are adapted to resume substantially their original shape by expansion beneath the water in the diffusion-wells and to permit their liquid contents including successive quantities of saccharine matter to freely escape when the chips are repressed.

4. In the extraction of saccharine matter from sugar-cane by roller-pressing and diffusion combined, the method of promoting diffusion consisting in first crushing and thereby flattening the cane, then cutting it into chips in the form of short pieces less than one inch long having ends substantially at right angles to the length of the cane and exposing the cellular tissue at both ends of each chip, and then forcing the chips down into and through the water in the succeeding diffusion-well and permitting them to expand beneath the water, substantially as hereinbefore specified.

MARK R. SPELMAN.

Witnesses:
 MURRAY SAYER,
 A. HARDING.